United States Patent
Zhang et al.

(10) Patent No.: US 11,490,413 B2
(45) Date of Patent: Nov. 1, 2022

(54) TECHNIQUES AND APPARATUSES FOR IMPROVING NEW RADIO COVERAGE

(71) Applicants: QUALCOMM Incorporated, San Diego, CA (US); Yu Zhang, Beijing (CN); Hao Xu, Beijing (CN); Chao Wei, Beijing (CN); Peng Cheng, Beijing (CN); Wanshi Chen, San Diego, CA (US); Peter Gaal, San Diego, CA (US); Durga Prasad Malladi, San Diego, CA (US)

(72) Inventors: Yu Zhang, Beijing (CN); Hao Xu, Beijing (CN); Chao Wei, Beijing (CN); Peng Cheng, Beijing (CN); Wanshi Chen, San Diego, CA (US); Peter Gaal, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 16/633,399

(22) PCT Filed: Sep. 7, 2018

(86) PCT No.: PCT/CN2018/104584
§ 371 (c)(1),
(2) Date: Jan. 23, 2020

(87) PCT Pub. No.: WO2019/047919
PCT Pub. Date: Mar. 14, 2019

(65) Prior Publication Data
US 2021/0160916 A1    May 27, 2021

(30) Foreign Application Priority Data

Sep. 8, 2017  (CN) ................. PCT/CN2017/101015

(51) Int. Cl.
| | | |
|---|---|---|
| H04W 72/14 | (2009.01) | |
| H04L 5/00 | (2006.01) | |
| H04W 72/04 | (2009.01) | |

(52) U.S. Cl.
CPC ........... H04W 72/14 (2013.01); H04L 5/0055 (2013.01); H04W 72/042 (2013.01); H04W 72/046 (2013.01)

(58) Field of Classification Search
CPC . H04W 72/14; H04W 72/042; H04W 72/046; H04L 5/0055
See application file for complete search history.

(56) References Cited

U.S. PATENT DOCUMENTS 10,638,480 B2 *  4/2020  Wong ................ H04W 72/0453
2006/0039299 A1  2/2006  Ihm et al.
(Continued)

FOREIGN PATENT DOCUMENTS

| CN | 107135021 A | 9/2017 |
|---|---|---|
| CN | 108476513 A | 8/2018 |

(Continued)

OTHER PUBLICATIONS

International Search Report and Written Opinion—PCT/CN2018/104584—ISA/EPO—dated Nov. 28, 2018.
(Continued)

Primary Examiner — Michael J Moore, Jr.
(74) Attorney, Agent, or Firm — Qualcomm Incorporated

(57) ABSTRACT

Certain aspects of the present disclosure generally relate to wireless communication. More particularly, certain aspects of the present disclosure relate to early termination of a downlink channel repetition transmission, early termination of an uplink channel repetition, and/or determination of a plurality of beams for a repetition transmission. Numerous other aspects are provided.

28 Claims, 16 Drawing Sheets

(56) References Cited

U.S. PATENT DOCUMENTS

| | | |
|---|---|---|
| 2010/0172308 A1 | 7/2010 | Nam et al. |
| 2012/0163486 A1 | 6/2012 | Yim et al. |
| 2014/0307654 A1* | 10/2014 | Kim ............... H04B 7/0647 370/329 |
| 2017/0054479 A1* | 2/2017 | Sang ............... C07D 413/10 |
| 2017/0111886 A1* | 4/2017 | Kim ............... H04W 72/042 |
| 2017/0214495 A1 | 7/2017 | Golitschek et al. |
| 2017/0257190 A1 | 9/2017 | Wang et al. |
| 2017/0288833 A1* | 10/2017 | Islam ............... H04W 72/04 |
| 2018/0288746 A1* | 10/2018 | Zhang ............... H04L 1/0031 |
| 2018/0302889 A1* | 10/2018 | Guo ............... H04B 17/309 |
| 2019/0007963 A1* | 1/2019 | Akkarakaran ....... H04W 72/14 |
| 2019/0020506 A1* | 1/2019 | Cheng ............... H04L 1/1819 |
| 2019/0349061 A1* | 11/2019 | Cirik ............... H04L 1/1896 |
| 2020/0059398 A1* | 2/2020 | Pan ............... H04B 7/088 |
| 2020/0213978 A1* | 7/2020 | Iyer ............... H04L 1/1812 |
| 2020/0236670 A1* | 7/2020 | Xiong ............... H04J 13/0074 |
| 2021/0160916 A1* | 5/2021 | Zhang ............... H04L 1/189 |

FOREIGN PATENT DOCUMENTS

| | | | |
|---|---|---|---|
| WO | 2015175190 A1 | 11/2015 | |
| WO | WO-2017022902 A1 * | 2/2017 | ........... H04W 28/16 |
| WO | 2017127126 A1 | 7/2017 | |
| WO | 2017146755 A1 | 8/2017 | |

OTHER PUBLICATIONS

International Search Report and Written Opinion—PCT/CN2017/101015—ISA/EPO—dated May 30, 2018.

Supplementary European Search Report—EP18853552—Search Authority—The Hague—dated Sep. 29, 2021.

Huawei, et al., "Grant-Free Transmission for UL URLLC", 3GPP TSG RAN WG1 Meeting #89, 3GPP Draft; R1-1706919, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, 7 Pages, May 14, 2017 (May 14, 2017), 7 Pages, XP051272149, Retrieved from the Internet: URL: http://www.3gpp.org/ftp/Meetings_3GPP_SYNC/RAN1/Docs/ [retrieved on May 14, 2017] the whole document.

Supplementary Partial European Search Report—EP18853552—Search Authority—The Hague—dated May 6, 2021.

\* cited by examiner

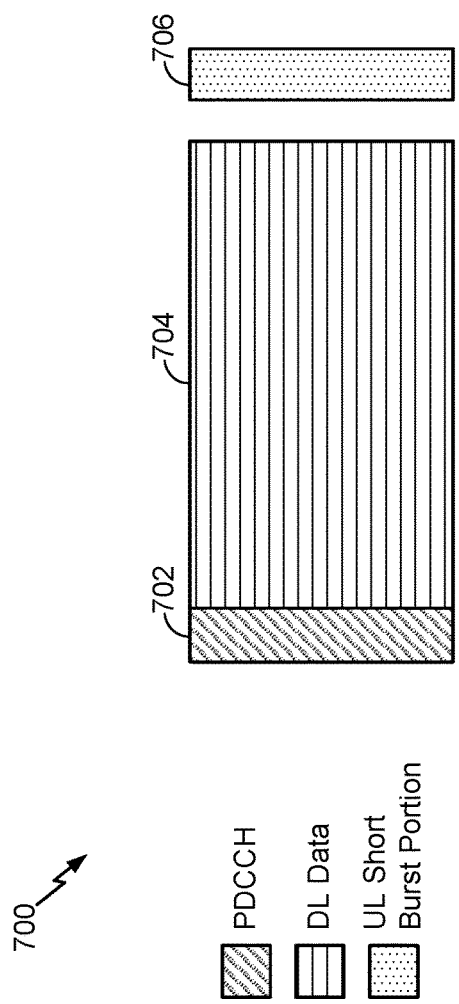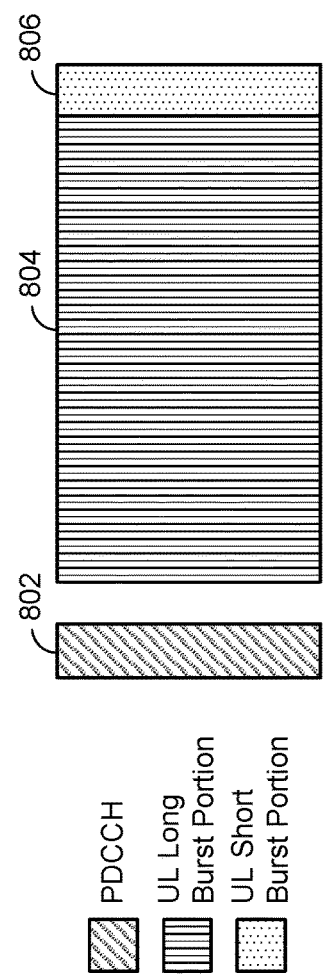

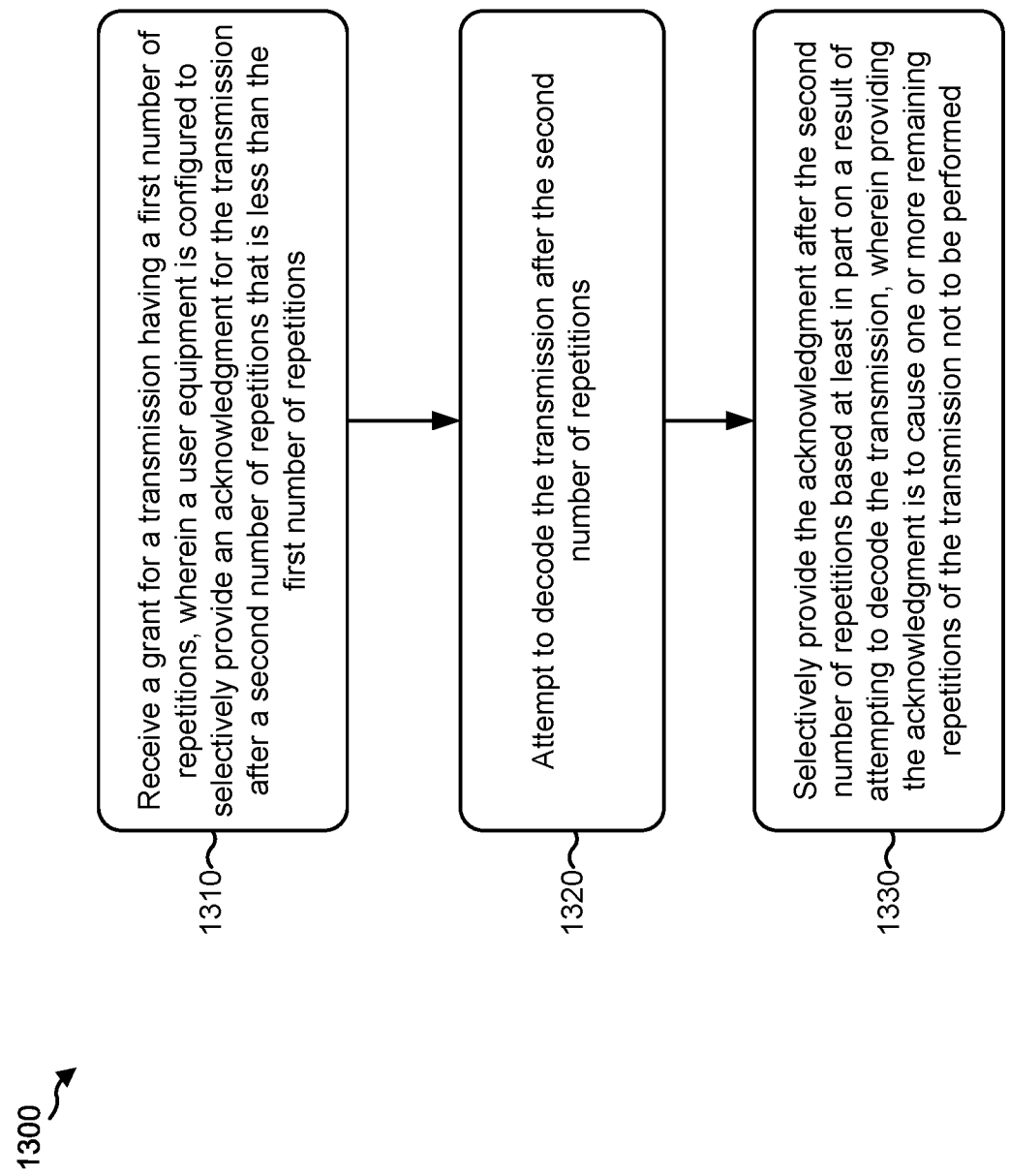

TECHNIQUES AND APPARATUSES FOR IMPROVING NEW RADIO COVERAGE

CROSS-REFERENCE TO RELATED APPLICATIONS

This application is a 371 national stage of PCT Application No. PCT/CN2018/104584 filed on Sep. 7, 2018, entitled "TECHNIQUES AND APPARATUSES FOR IMPROVING NEW RADIO COVERAGE," which claims priority to PCT Application Number PCT/CN2017/101015, filed on Sep. 8, 2017, entitled "TECHNIQUES AND APPARATUSES FOR IMPROVING NEW RADIO COVERAGE," all of which are incorporated by reference herein.

FIELD OF THE DISCLOSURE

Aspects of the present disclosure generally relate to wireless communication, and more particularly to techniques and apparatuses for improving New Radio (NR) coverage.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include receiving a grant for a transmission having a first number of repetitions, wherein the user equipment is configured to selectively provide an acknowledgment for the transmission after a second number of repetitions that is less than the first number of repetitions, attempting to decode the transmission after the second number of repetitions, and selectively providing the acknowledgment after the second number of transmissions based at least in part on a result of attempting to decode the transmission, wherein providing the acknowledgment is to cause one or more remaining repetitions of the transmission not to be performed.

In some aspects, a user equipment for wireless communication may include memory and one or more processors operatively coupled to the memory. The memory and the one or more processors may be configured to receive a grant for a transmission having a first number of repetitions, wherein the user equipment is configured to selectively provide an acknowledgment for the transmission after a second number of repetitions that is less than the first number of repetitions, attempt to decode the transmission after the second number of repetitions, and selectively provide the acknowledgment after the second number of transmissions based at least in part on a result of attempting to decode the transmission, wherein providing the acknowledgment is to cause one or more remaining repetitions of the transmission not to be performed.

In some aspects, a non-transitory computer-readable medium may store one or more instructions for wireless communication. The one or more instructions, when executed by one or more processors of a user equipment, may cause the one or more processors to receive a grant for a transmission having a first number of repetitions, wherein the user equipment is configured to selectively provide an acknowledgment for the transmission after a second number of repetitions that is less than the first number of repetitions, attempt to decode the transmission after the second number of repetitions, and selectively provide the acknowledgment after the second number of transmissions based at least in part on a result of attempting to decode the transmission, wherein providing the acknowledgment is to cause one or more remaining repetitions of the transmission not to be performed.

In some aspects, an apparatus for wireless communication may include means for receiving a grant for a transmission having a first number of repetitions, wherein the apparatus is configured to selectively provide an acknowledgment for the transmission after a second number of repetitions that is less than the first number of repetitions, means for attempting to decode the transmission after the second number of repetitions, and means for selectively providing the acknowledgment after the second number of transmissions based at least in part on a result of attempting to decode the transmission, wherein providing the acknowledgment is to cause one or more remaining repetitions of the transmission not to be performed.

In some aspects, a method for wireless communication may include receiving a grant for an uplink transmission associated with a number of repetitions, determining whether an indication that the uplink transmission is to be terminated before the number of repetitions is received, and selectively terminating the uplink transmission before the number of repetitions based at least in part on whether the indication is received.

In some aspects, a user equipment for wireless communication may include memory and one or more processors operatively coupled to the memory. The memory and the one or more processors may be configured to receive a grant for an uplink transmission associated with a number of repetitions, determine whether an indication that the uplink transmission is to be terminated before the number of repetitions is received, and selectively terminate the uplink transmission before the number of repetitions based at least in part on whether the indication is received.

In some aspects, a non-transitory computer-readable medium may store one or more instructions for wireless communication. The one or more instructions, when executed by one or more processors of a user equipment, may cause the one or more processors to receive a grant for an uplink transmission associated with a number of repetitions, determine whether an indication that the uplink transmission is to be terminated before the number of repetitions is received, and selectively terminate the uplink transmission before the number of repetitions based at least in part on whether the indication is received.

In some aspects, an apparatus for wireless communication may include means for receiving a grant for an uplink transmission associated with a number of repetitions, means for determining whether an indication that the uplink transmission is to be terminated before the number of repetitions is received, and means for selectively terminating the uplink transmission before the number of repetitions based at least in part on whether the indication is received.

In some aspects, a method for wireless communication may include receiving a grant for a communication of multiple repetitions, wherein the multiple repetitions are to be transmitted using multiple, different transmit beams, and identifying the multiple, different transmit beams based at least in part on at least one of the grant, the multiple repetitions, information identifying the multiple, different transmit beams, or a rule for identifying the multiple, different transmit beams.

In some aspects, a user equipment for wireless communication may include memory and one or more processors operatively coupled to the memory. The memory and the one or more processors may be configured to receive a grant for a communication of multiple repetitions, wherein the multiple repetitions are to be transmitted using multiple, different transmit beams, and identify the multiple, different transmit beams based at least in part on at least one of the grant, the multiple repetitions, information identifying the multiple, different transmit beams, or a rule for identifying the multiple, different transmit beams.

In some aspects, a non-transitory computer-readable medium may store one or more instructions for wireless communication. The one or more instructions, when executed by one or more processors of a user equipment, may cause the one or more processors to receive a grant for a communication of multiple repetitions, wherein the multiple repetitions are to be transmitted using multiple, different transmit beams, and identify the multiple, different transmit beams based at least in part on at least one of the grant, the multiple repetitions, information identifying the multiple, different transmit beams, or a rule for identifying the multiple, different transmit beams.

In some aspects, an apparatus for wireless communication may include means for receiving a grant for a communication of multiple repetitions, wherein the multiple repetitions are to be transmitted using multiple, different transmit beams, and means for identifying the multiple, different transmit beams based at least in part on at least one of the grant, the multiple repetitions, information identifying the multiple, different transmit beams, or a rule for identifying the multiple, different transmit beams.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

FIG. 13 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
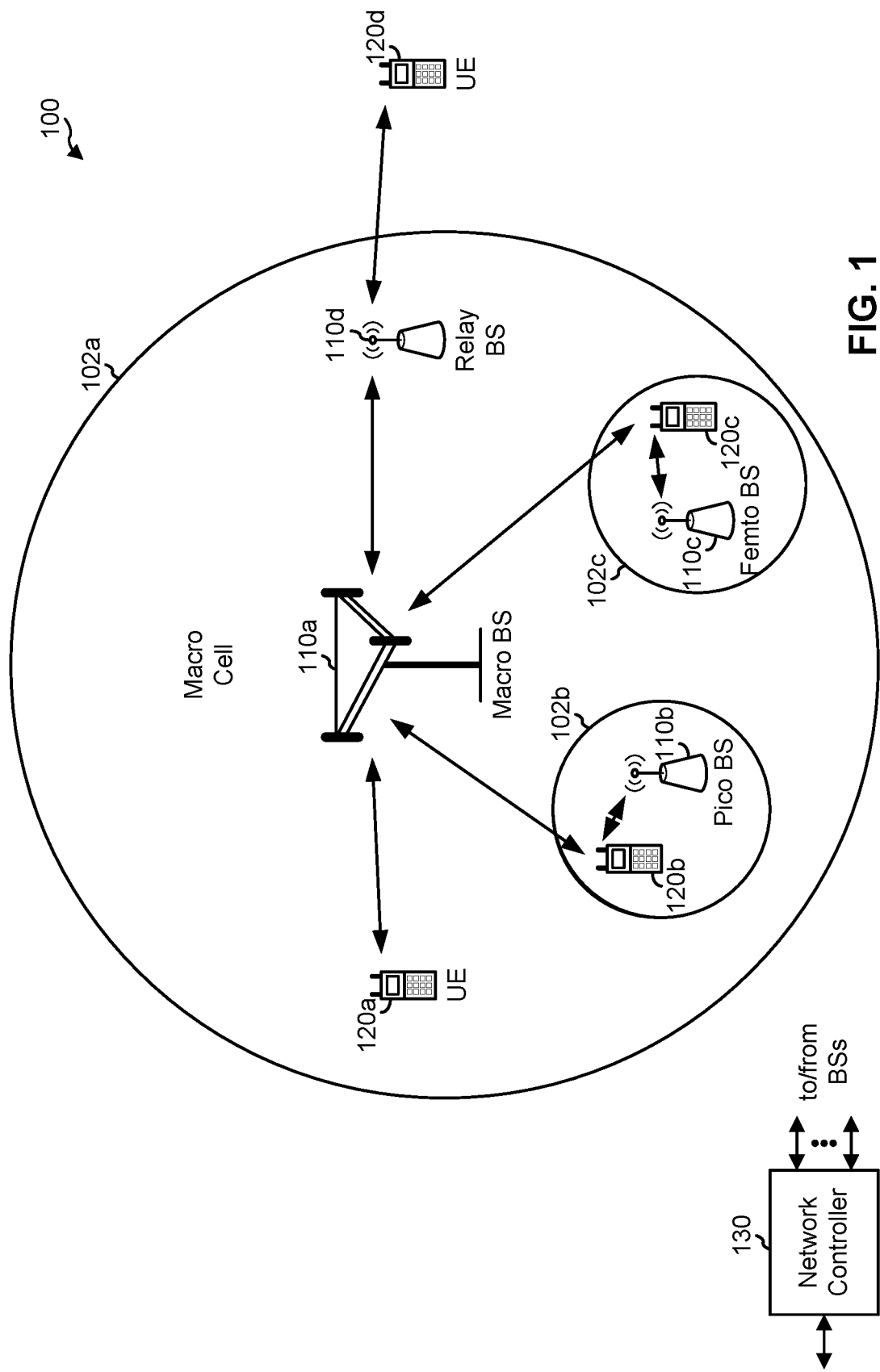
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
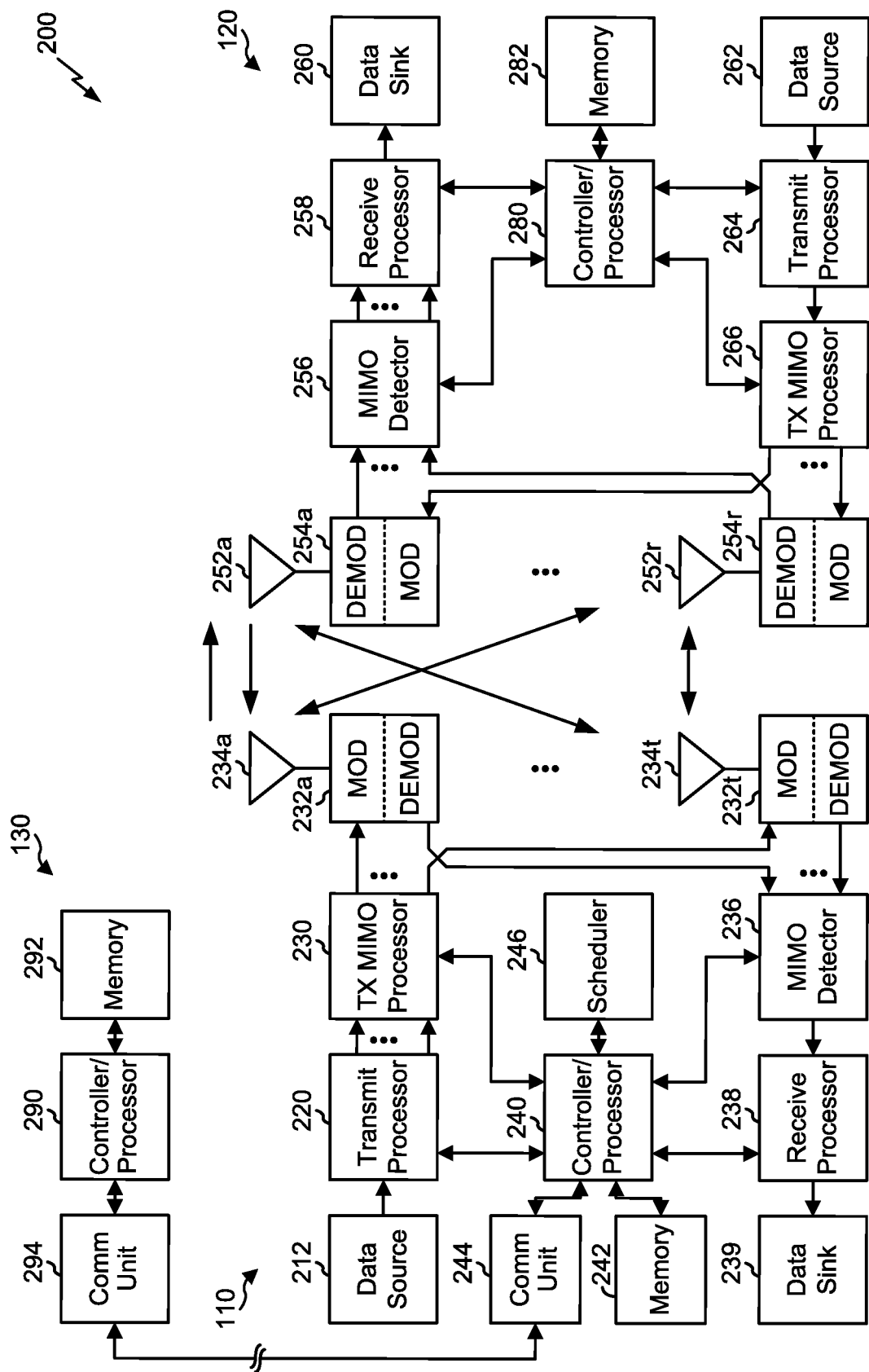
FIG. 2 is a block diagram conceptually illustrating an example of a base station in communication with a user equipment (UE) in a wireless communication network, in accordance with certain aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at BS 110 and UE 120, respectively, to perform techniques for improving NR coverage. For example, controller/processor 280 and/or other processors and modules at UE 120, may perform or direct operations of UE 120 to perform techniques for improving NR coverage. For example, controller/processor 280 and/or other controllers/processors and modules at UE 120 may perform or direct operations of, for example, process 1300 of FIG. 13, process 1400 of FIG. 14, process 1500 of FIG. 15, and/or other processes as described herein. In some aspects, one or more of the components shown in FIG. 2 may be employed to perform example process 1300, example process 1400, example process 1500, and/or other processes for the techniques described herein. Memories 242 and 282 may store data and program codes for BS 110 and UE 120, respectively. A scheduler 246 may schedule UEs for data transmission on the downlink and/or uplink.

In some aspects, UE 120 may include means for receiving a grant for a transmission having a first number of repetitions, means for attempting to decode the transmission after a second number of repetitions, means for selectively providing an acknowledgment after the second number of transmissions based at least in part on a result of attempting to decode the transmission, means for receiving an indication that one or more remaining repetitions are not to be performed, means for receiving the one or more remaining repetitions, means for attempting to decode the one or more remaining repetitions, means for selectively providing another acknowledgment, after the second number of repetitions of the one or more remaining repetitions, based at least in part on a result of attempting to decode the one or more remaining repetitions, means for receiving a grant for an uplink transmission associated with a number of repetitions, means for determining whether an indication that the uplink transmission is to be terminated before the number of repetitions is received, means for selectively terminating the uplink transmission before the number of repetitions based at least in part on whether the indication is received, means for receiving a grant for a communication of multiple repetitions wherein the multiple repetitions are to be transmitted using multiple, different transmit beams, means for identifying the multiple, different transmit beams based at least in part on at least one of the grant, the multiple repetitions, information identifying the multiple, different transmit beams, or a rule for identifying the multiple, different transmit beams, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
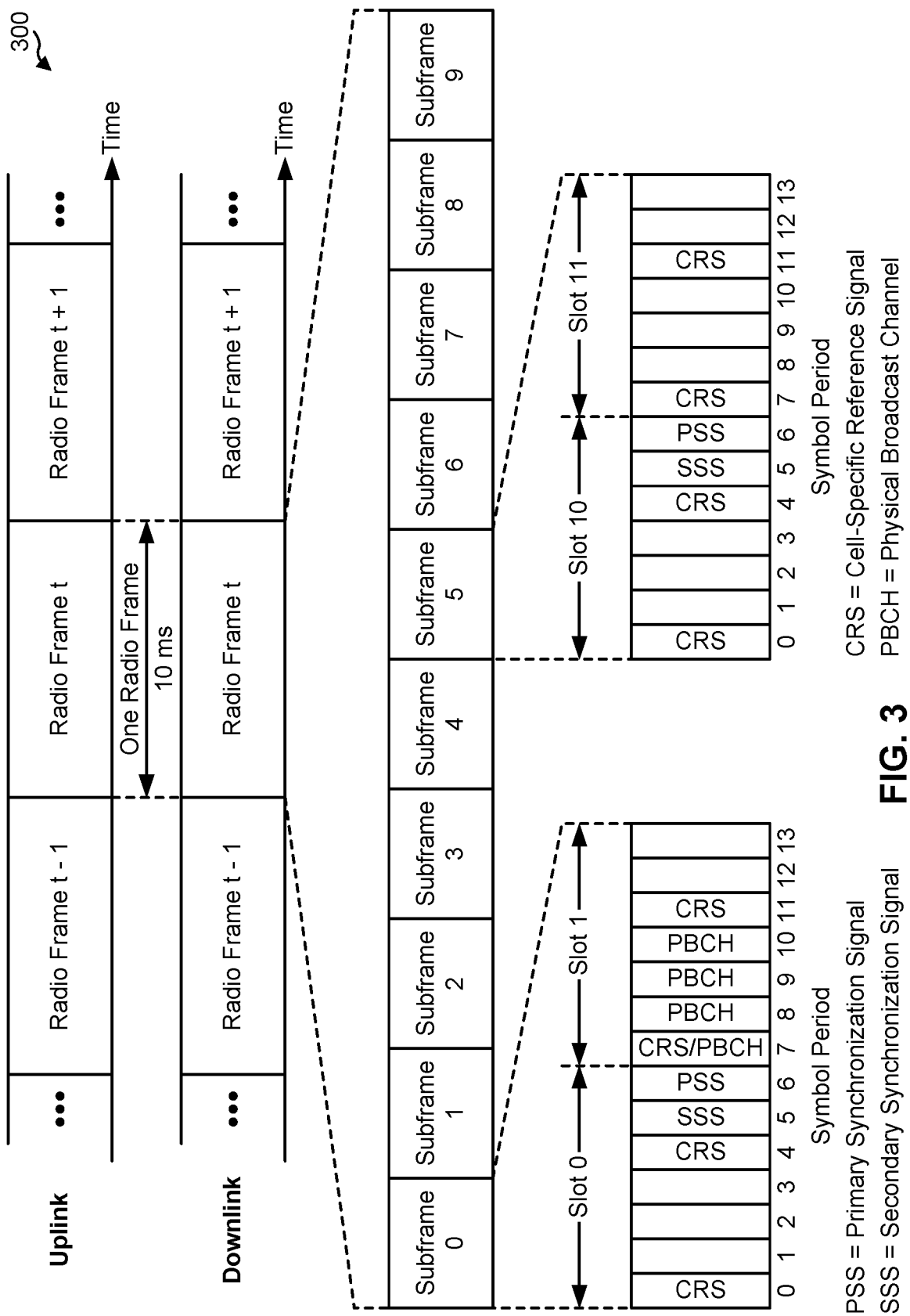
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
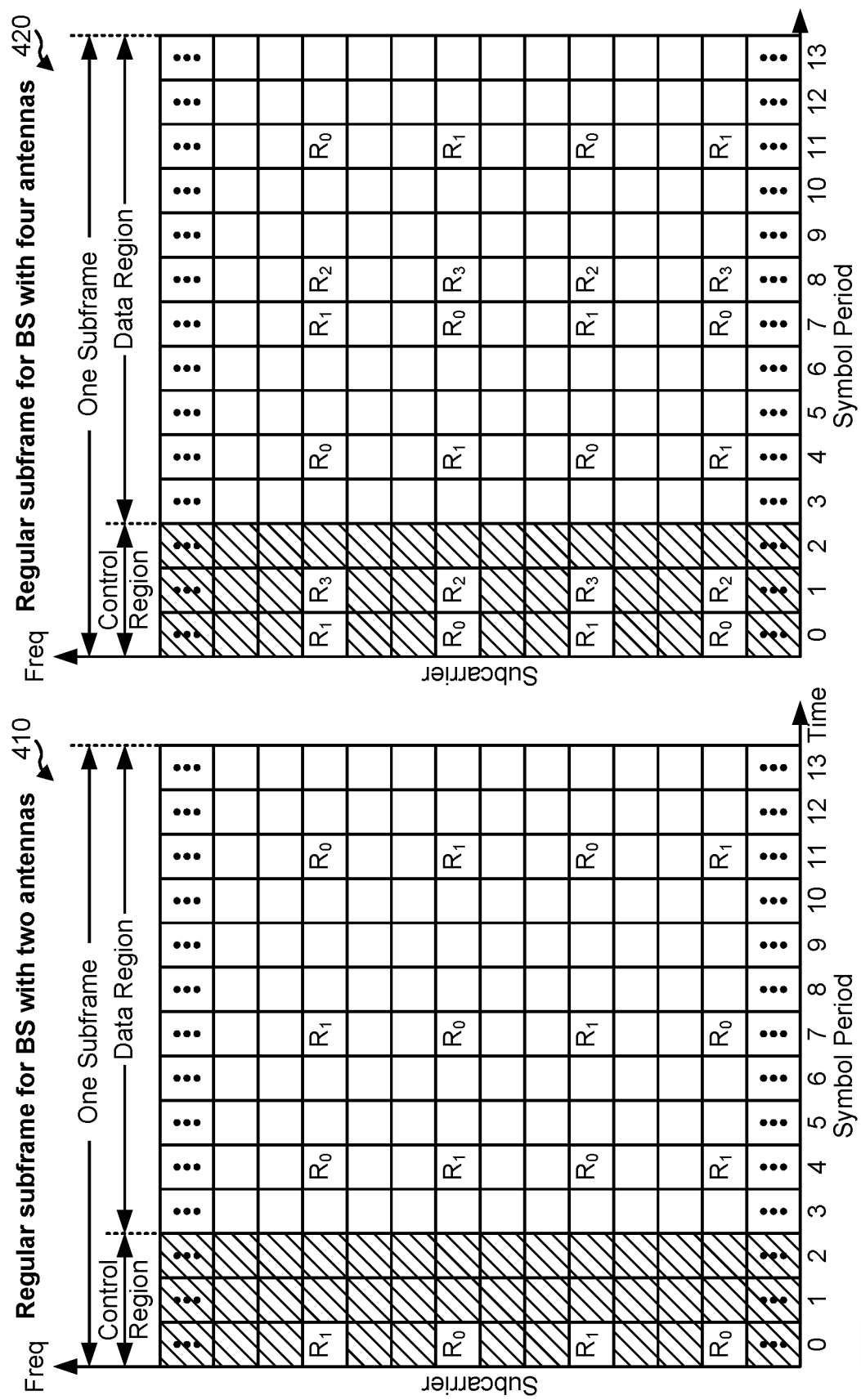
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
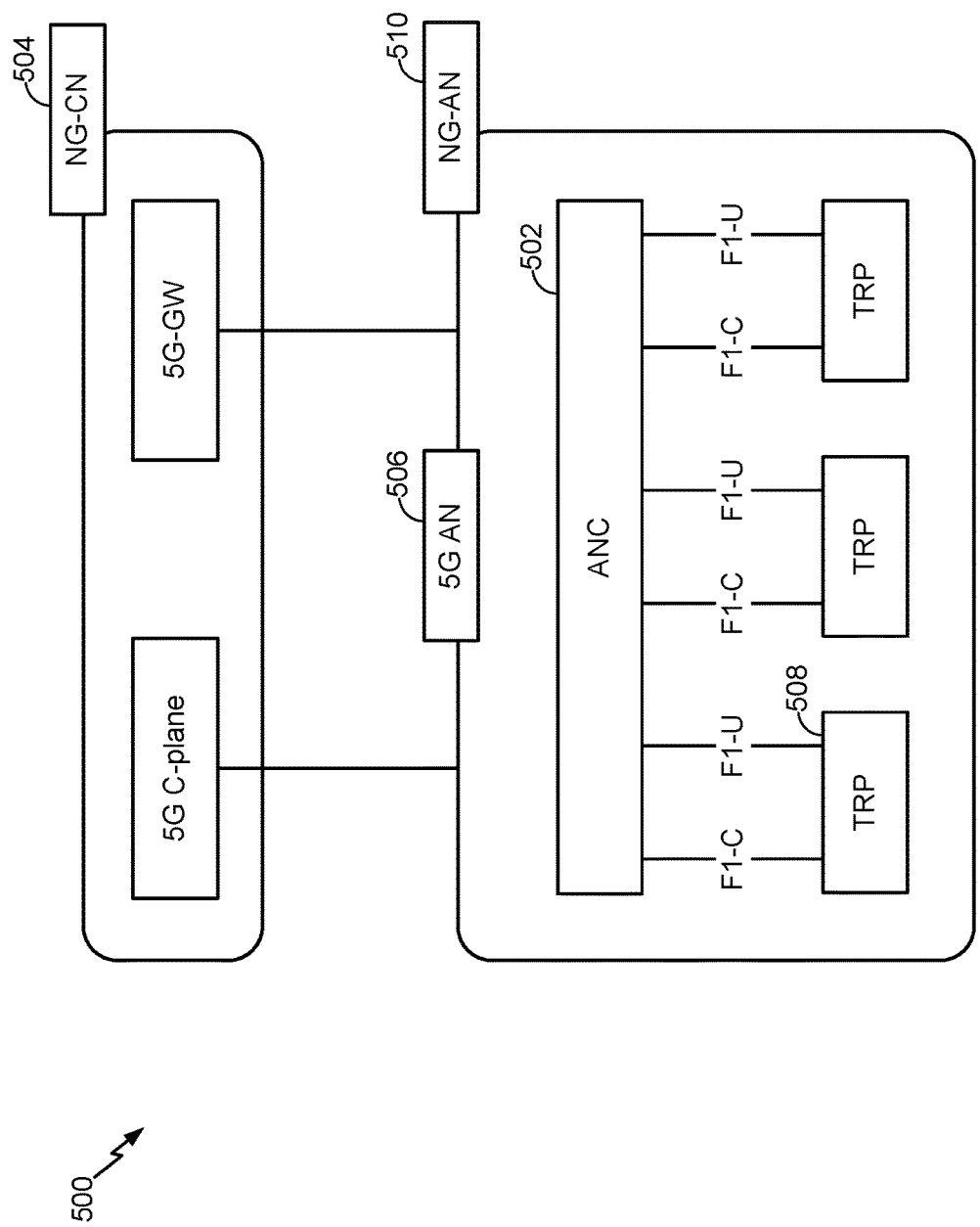
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
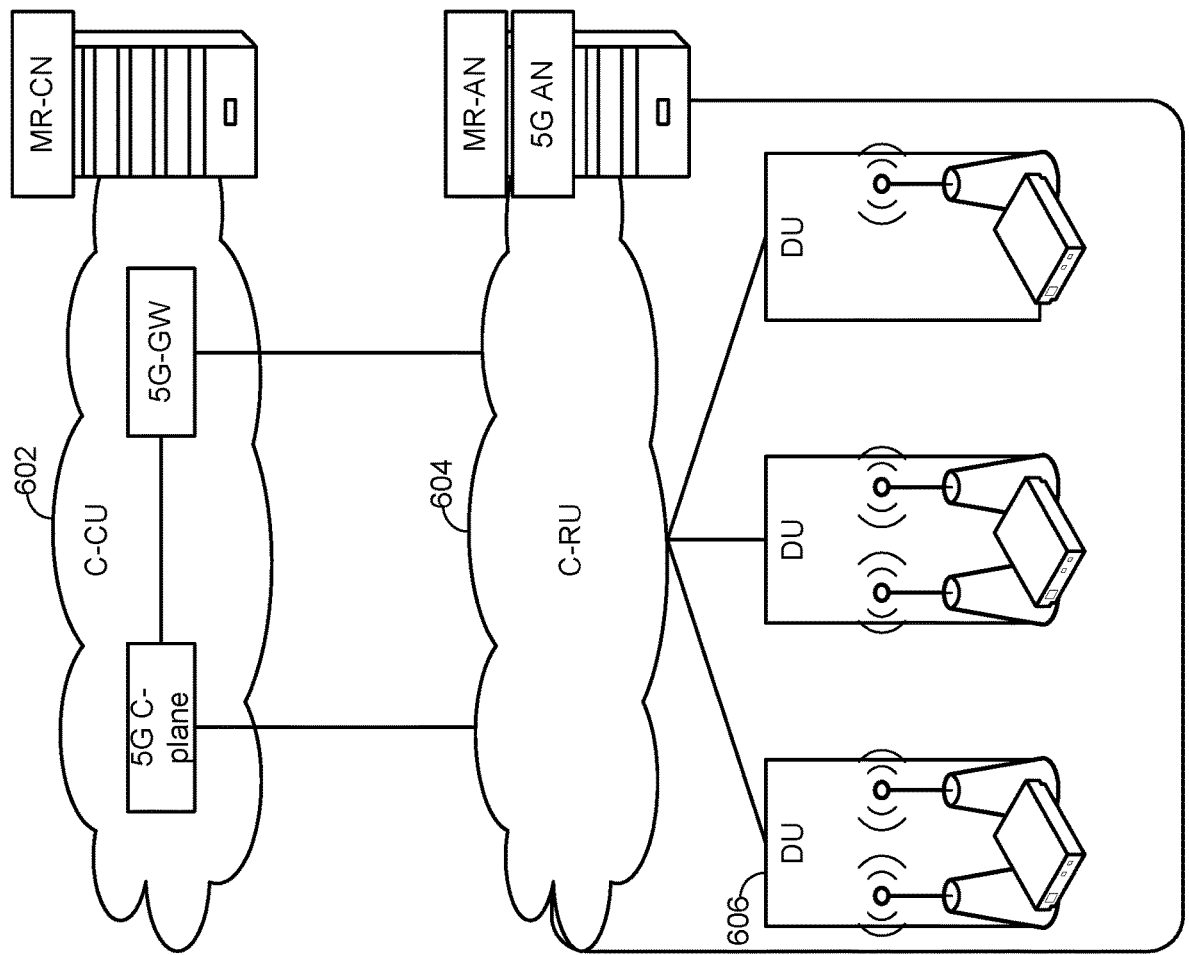
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the DL data portion 704. Non-limiting examples of information that may be included in the UL short burst portion 706 include an acknowledgment (ACK) signal (e.g., a physical uplink control channel (PUCCH) ACK, a PUSCH ACK, an immediate ACK), a negative acknowledgment (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

In some aspects, described herein, the control portion 702 may include an early termination indication. Additionally, or alternatively, the UL short burst portion 706 may include a HARQ ACK/NACK that is transmitted based at least in part on whether a repetition communication is successfully decoded.

As indicated above, FIG. 7 is provided merely as an example. Other examples are possible and may differ from what was described with regard to FIG. 7.

FIG. 8 is a diagram 800 showing an example of an UL-centric subframe or wireless communication structure.

The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some aspects, described herein, the control portion 802 may include an early termination indication. Additionally, or alternatively, the UL short burst portion 806 may include a HARQ ACK/NACK that is transmitted based at least in part on whether a repetition communication is successfully decoded.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A base station may enhance coverage of a wireless network by performing or configuring repetitions of a communication between the base station and a UE. For example, the UE or the base station may perform a fixed number of repetitions of the communication in different transmission time intervals (TTIs) and/or using different transmit beams for each repetition. Using different transmit beams may improve spatial diversity of the communication, and using different TTIs may improve time diversity of the communication. In a legacy network, such as 4G/LTE, the base station may perform beamforming for the different transmit beams, and the UE may use a single receive beam, or a small number of receive beams, to receive the different transmit beams.

However, in a 5G/NR network, the fixed number of repetitions may lead to inefficient resource utilization. For example, a UE or base station may be scheduled with a repetition transmission using 4 TTIs, but the UE or base station may only require 2 or 3 TTIs to decode the repetition transmission. Therefore, a last 1 or 2 TTIs of the repetition transmission may be wasted. Furthermore, beamforming by the base station may be transparent to the UE in 5G/NR. This may make it difficult to apply transmit beam diversity for repetition transmissions in 5G/NR, wherein the UE creates receive beams corresponding to the transmit beams to receive the transmit beams.

Some techniques and apparatuses described herein provide early termination of a repetition communication of a downlink data channel (e.g., a physical downlink shared channel (PDSCH)) based at least in part on an HARQ acknowledgement information (e.g., a HARQ ACK/NACK), which conserves resources that would otherwise be used to complete the repetition communication when decoding is completed before the end of the repetition communication. Additionally, or alternatively, some techniques and apparatuses described herein provide early termination of a repetition communication of an uplink data channel (e.g., a physical uplink shared channel (PUSCH)) based at least in part on an early termination indication, which conserves resources that would otherwise be used to complete the repetition communication when decoding is completed before the end of the repetition communication.

Furthermore, some techniques and apparatuses described herein provide for identification of one or more transmit beams to be used for a repetition communication. For example, the one or more transmit beams may be identified based at least in part on one or more of a grant, the repetition communication, information identifying the one or more transmit beams, or a rule for identifying the one or more transmit beams. In this way, multiple, different transmit beams can be used for a repetition communication (e.g., in the uplink and/or in the downlink), which improves spatial diversity of the repetition communication. By using the techniques and apparatuses described herein, coverage is improved while conserving network resources and improving spatial diversity or time diversity of communications.

A HARQ acknowledgment is described herein. In some aspects, the HARQ acknowledgment may include a negative ACK (NACK). For example, the HARQ acknowledgment may have a first value for the ACK, and may have a second value for the NACK.

Figure 9:
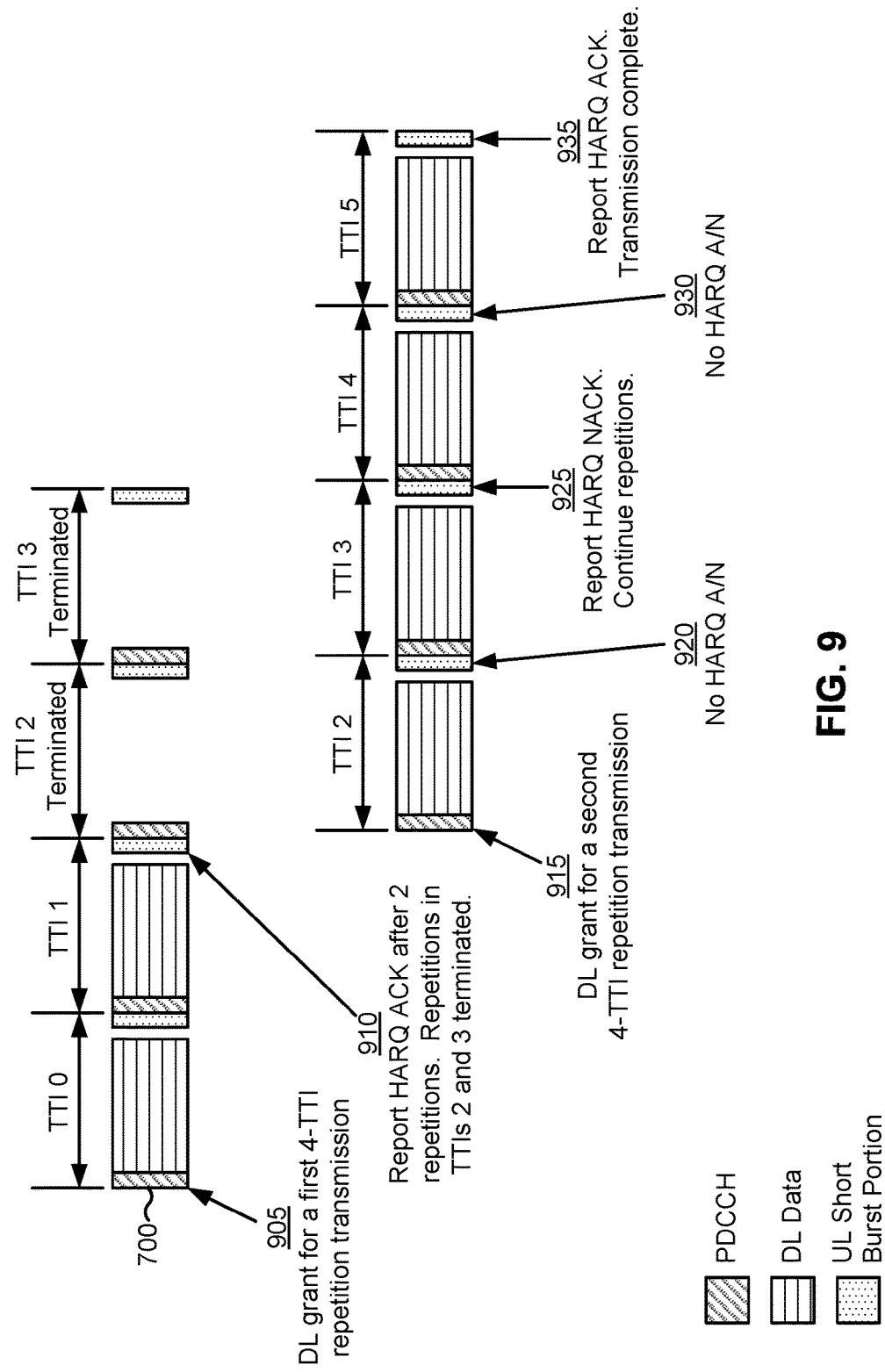
FIG. 9 is a diagram illustrating an example of early termination of a physical downlink shared channel (PDSCH) repetition transmission, in accordance with various aspects of the present disclosure.

FIG. 9 is a diagram illustrating an example 900 of early termination of a PDSCH repetition transmission, in accordance with various aspects of the present disclosure. The operations described in connection with FIG. 9 may be performed by a wireless communication device, such as a user equipment (e.g., UE 120), a base station (e.g., BS 110), and/or the like. FIG. 9 is described with reference to the UE 120, but is not so limited. As shown, FIG. 9 includes communications in TTIs 0 through 5, and each communication includes a DL-centric subframe, such as the wireless communication structure described in connection with FIG. 7, above.

As shown in FIG. 9, and by reference number 905, the UE 120 may receive a downlink grant for a first repetition transmission that includes a first number of TTIs (e.g., 4 TTIs corresponding to 4 repetitions). In some aspects, a repetition transmission, such as the first repetition transmission or another repetition transmission or communication described herein, may include a different number of repetitions and/or TTIs (e.g., 3 repetitions, 8 repetitions, or any other number of repetitions that is greater than 1). In some aspects, the repetition transmission may be referred to as a communication or a repetition communication.

As shown by the horizontal hatching in TTIs 0 and 1, the UE 120 may receive downlink data in TTI 0 and TTI 1. For example, the downlink data received in TTI 1 may be a repetition of the downlink data received in TTI 0. The UE 120 may attempt to decode the downlink data received in TTIs 0 and 1 (e.g., using soft combining or a similar technique). For example, the UE 120 may attempt to decode the downlink data after a second number of TTIs or repetitions that is less than the first number of TTIs or repetitions. In some aspects, the second number of TTIs or repetitions may include, for example, 3 repetitions, 4 repetitions, 5 repetitions, and/or the like.

As shown by reference number 910, the UE 120 may report an acknowledgment (e.g., a HARQ ACK) after 2 repetitions based at least in part on successfully decoding TTIs 0 and 1. Thus, the repetitions in TTIs 2 and 3 may be terminated (e.g., since decoding of the communication is already successful). In some aspects, the BS 110 may indicate that the repetition in TTIs 2 and 3 is to be terminated based at least in part on the HARQ ACK. For example, the BS 110 may provide an indication in a dedicated bit of downlink control information (DCI) or in a downlink grant for a second repetition transmission.

As shown by reference number 915, the UE 120 may receive a downlink grant for a second repetition transmission. As indicated above, the downlink grant for the second repetition communication may indicate that the first repetition communication is to be terminated. Therefore, and as shown, TTIs 2 and 3 may not be used for the first repetition transmission.

As shown by reference number 920, in some aspects, the UE 120 may not transmit an acknowledgment or negative acknowledgment. For example, since the second number of repetitions has not yet occurred, the UE 120 may not attempt decoding of the second repetition transmission. In this way, the UE 120 may conserve resources that would otherwise be used to attempt decoding when a likelihood of success is low.

As shown by reference number 925, in some cases, the UE 120 may fail to decode the repetition transmission after the second number of repetitions, and may therefore transmit a negative acknowledgment (e.g., HARQ NACK). In such a case, the BS 110 may continue to transmit one or more remaining repetitions of the repetition transmission. As shown by reference number 930, the UE 120 may not transmit an acknowledgment or negative acknowledgment until the second number of repetitions has occurred again. For example, if the second number of repetitions is 2 repetitions, the UE 120 may attempt decoding, and may transmit an acknowledgment or negative acknowledgment, after 2 repetitions, 4 repetitions, 6 repetitions, and so on.

In some aspects, the UE 120 may not transmit a HARQ NACK after the second number of repetitions. For example, some aspects may not use a NACK to indicate unsuccessful decoding. In such a case, the BS 110 may determine that decoding was unsuccessful based at least in part on expiry of a timer. For example, the BS 110 may determine that no HARQ ACK has been received within a particular time window in connection with the repetition communication, and may therefore determine that the UE 120 was unsuccessful in decoding the repetition communication. This may conserve network resources that would otherwise be used to provide a HARQ NACK.

As shown by reference number 935, the UE 120 may provide a HARQ ACK at TTI 5 based at least in part on successfully decoding the repetition transmission. In this way, the UE 120 may selectively cause a repetition transmission to be terminated early based at least in part on whether early decoding of the repetition transmission is successful. Thus, versatility of repetitious communications is improved, which improves compatibility of such repetitious communications with 5G/NR.

As indicated above, FIG. 9 is provided as an example. Other examples are possible and may differ from what was described with respect to FIG. 9.

Figure 10:
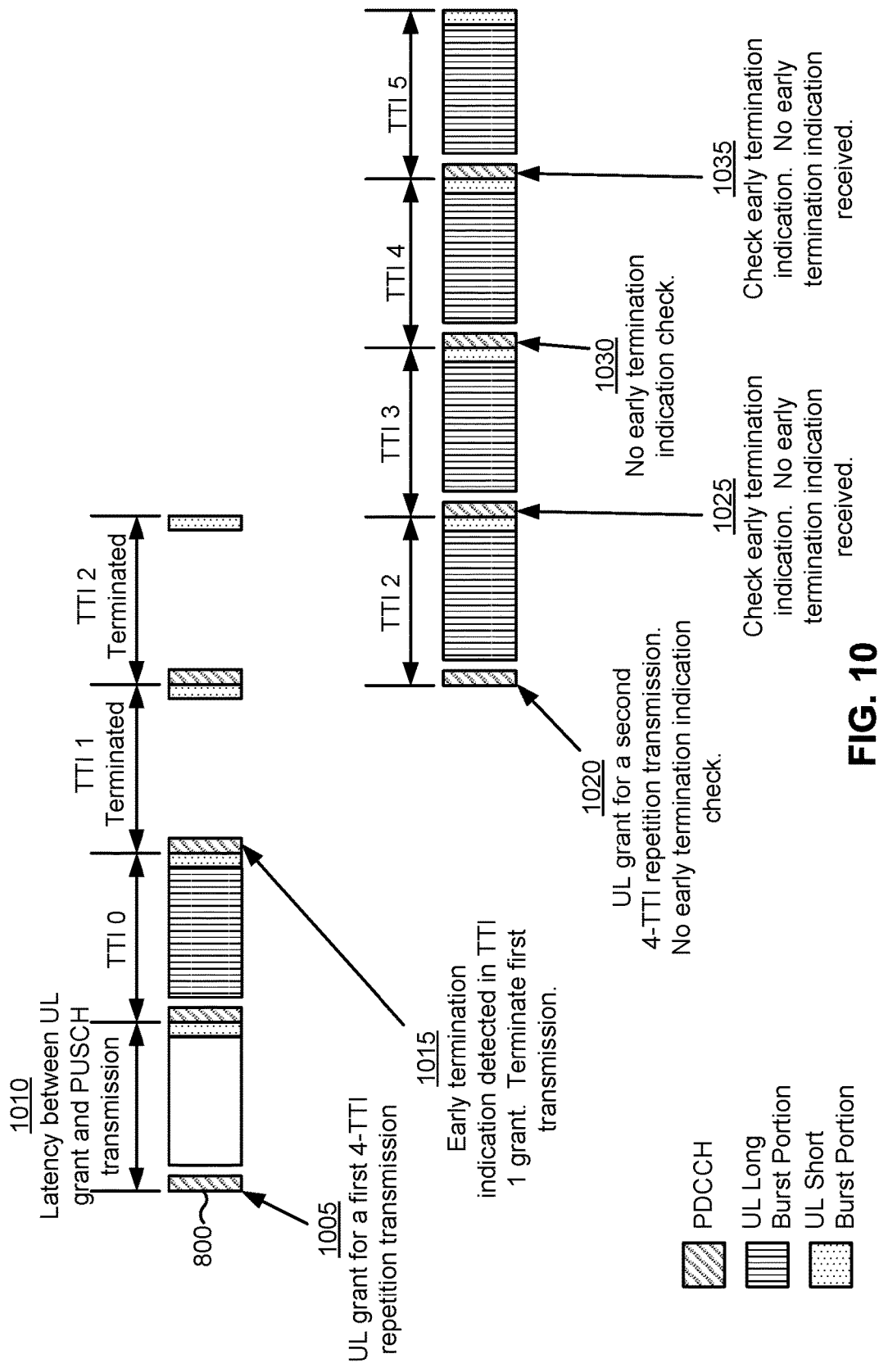
FIG. 10 is a diagram illustrating an example of early termination of a physical uplink shared channel (PUSCH) repetition transmission, in accordance with various aspects of the present disclosure.

FIG. 10 is a diagram illustrating an example 1000 of early termination of a PUSCH repetition transmission, in accordance with various aspects of the present disclosure. The operations described in connection with FIG. 10 may be performed by a wireless communication device, such as a user equipment (e.g., UE 120), a base station (e.g., BS 110), and/or the like. FIG. 10 is described with reference to the UE 120, but is not so limited. As shown, FIG. 10 includes communications in TTIs 0 through 5, and each communication includes a UL-centric subframe, such as the wireless communication structure described in connection with FIG. 8, above.

As shown in FIG. 10, and by reference number 1005, the UE 120 may receive an uplink grant for a first repetition transmission that includes a first number of TTIs (e.g., 4 TTIs corresponding to 4 repetitions).

As shown by reference number 1010, in some aspects, a latency may occur between the uplink grant and a PUSCH transmission associated with the uplink grant. In some aspects, no latency may occur. In some aspects, the latency may be greater than 1 TTI or less than 1 TTI. As shown by the vertical hatching in TTI 0, the UE 120 may transmit a first repetition in an UL long burst portion of TTI 0 after the latency has elapsed.

As shown by reference number 1015, the UE 120 may receive an early termination indication. Here, the UE 120 receives the early termination indication in a grant of TTI 1. The UE 120 may receive the early termination indication based at least in part on the BS 110 (or another receiver of the repetition transmission) successfully decoding the repetition transmission using the first repetition. As further shown, the UE 120 may terminate the repetition transmission based at least in part on receiving the early termination indication. For example, the UE 120 may not transmit the UL long burst portions of TTI 1 and TTI 2. In this way, transmission of the repetition transmission is flexibly terminated, which improves resource utilization and compatibility with 5G/NR.

In some aspects, the early termination indication may include or be a dedicated bit of DCI. In some aspects, the UE 120 may be configured to receive an early termination indication in particular slots. For example, the particular slots may be specified in a specification. Additionally, or alternatively, the particular slots may be configurable, and a set of slots in which the early termination indication may be received can be dynamically indicated (e.g., in the uplink grant, in DCI, in radio resource control (RRC) signaling, etc.).

As shown by reference number 1020, the UE 120 may receive an uplink grant for a second repetition transmission in TTI 2. As further shown, the UE 120 may not perform a check for the early termination indication in TTI 2. In some aspects, the uplink grant may include the early termination indication. For example, the UE 120 may identify the uplink grant as the early termination indication, may end the first repetition transmission, and may proceed with the second repetition transmission according to the early termination indication.

As shown by reference number 1025, the UE 120 may perform the check for the early termination indication in a PDCCH of TTI 3. For example, and as described above, the UE 120 may be configured to check particular resources for the early termination indication. As shown by reference number 1030, the UE 120 may not perform the early termination indication check for TTI 4. For example, in this case, the UE 120 may be configured to perform the early termination indication check for every other TTI. In some aspects, the UE 120 may be configured with a different interval (e.g., every third TTI, every fourth TTI, every TTI, and/or the like).

As shown by reference number 1035, the UE 120 may perform the early termination indication check in TTI 5. As further shown, the UE 120 does not receive the early termination indication in TTI 5. Therefore, the UE 120 may transmit the UL long burst portion of TTI 5, which may include the final repetition of the repetition communication. In this way, the repetition communication can be selectively terminated early, which improves flexibility of the repetition communication and compatibility with 5G/NR.

As indicated above, FIG. 10 is provided as an example. Other examples are possible and may differ from what was described with respect to FIG. 10.

Figure 11:
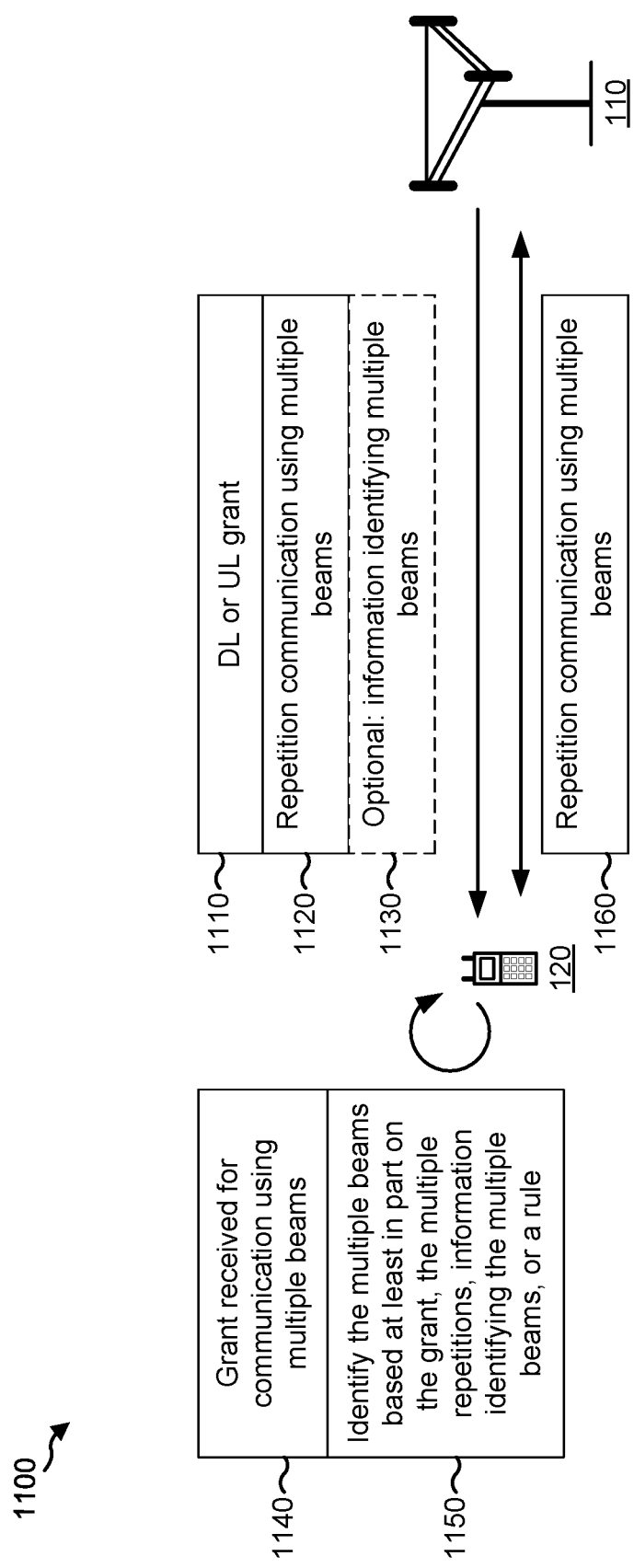
FIG. 11 is a diagram illustrating an example of determination of a plurality of beams for a repetition transmission, in accordance with various aspects of the present disclosure.

FIG. 11 is a diagram illustrating an example 1100 of determination of a plurality of beams for a repetition transmission, in accordance with various aspects of the present disclosure. FIG. 11 describes operations that can be performed in the uplink, in the downlink, or in both the uplink and the downlink. Therefore, unless specified otherwise, the operations described in FIG. 11 are applicable in the uplink, in the downlink, or in both the uplink and the downlink.

As shown in FIG. 11, and by reference number 1110, the BS 110 may provide a grant to the UE 120. As further shown, in some aspects, the grant may be a downlink grant. In some aspects, the grant may be an uplink grant.

As shown by reference number 1120, the grant may be for a repetition communication. For example, when the grant is an uplink grant, the repetition communication may be a communication of two or more TTIs or repetitions to be transmitted by the UE 120. When the grant is a downlink grant, the repetition may be a communication of two or more TTIs or repetitions to be transmitted by the BS 110 and received by the UE 120.

As further shown, the grant may indicate that the repetition communication is to use multiple beams. In 5G/NR, a beam pair is used to communicate between the UE 120 and the BS 110. Therefore, for the repetition communication between the UE 120 and the BS 110 to be successful, the UE 120 may need to know which beams to use to perform each repetition of the repetition communication. The operations described in connection with FIGS. 11 and 12A-12C provide techniques for determining which beams to use to perform (e.g., transmit or receive) each repetition of the repetition communication.

As shown by reference number 1130, the grant may optionally include information identifying the multiple beams. In such a case, the UE 120 may identify the multiple beams based at least in part on the information identifying the multiple beams. For a more detailed description of this determination, refer to the description associated with reference number 1150, below. As shown by reference number 1140, the UE 120 may receive the grant for the repetition communication using the multiple beams.

As shown by reference number 1150, the UE 120 may identify the multiple beams to be used for the repetition communication. The UE 120 may identify the multiple beams so that beam pairing between the UE 120 and the BS 110 for the repetition communication is successful. As used herein, the multiple beams may refer to transmit beams generated by the BS 110 for the repetition communication in the downlink, to receive beams generated by the UE 120 for the repetition communication in the downlink, to transmit beams generated by the UE 120 for the repetition communication in the uplink, to receive beams generated by the BS 110 for the repetition communication in the uplink, or to any combination of the above. As shown by reference number 1160, the UE 120 and the BS 110 may perform the repetition communication using the multiple beams.

In some aspects, a transmit beam for a first repetition of the repetition communication may be indicated or identified in the grant. In such a case, transmit beams for subsequent repetitions of the repetition communication may be determined by the UE 120 based at least in part on a rule. For example, the rule may identify a beam cycling pattern for repetition communications. In some aspects, the beam cycling pattern may be based at least in part on an index of a slot in which the grant is received, an index of a slot in which a repetition is to be transmitted or received, and/or a combination of the above.

In some aspects, the beam cycling pattern may be defined in a relevant specification. Additionally, or alternatively, the beam cycling pattern may be configured based at least in part on higher layer signaling. For example, the UE 120 may be configured with multiple cycling patterns, and one of the patterns may be selected based at least in part on information in the grant, a DCI, a media access control (MAC) control element (CE), an RRC signaling, and/or the like. In this way, radio resources may be conserved that would otherwise be used to transmit information identifying each beam of the beam cycling pattern.

In some aspects, a beam for each repetition may be indicated in the grant. For example, the grant may identify a plurality of beams corresponding to a plurality of repetitions of the repetition transmission. In this way, processor resources of the UE 120 may be conserved in comparison to determining the beam cycling pattern and/or beam mapping by the UE 120.

In some aspects, the UE 120 may receive information identifying a set of beams, and an association between the set of beams and the repetitions may indicate which beams are to be used for which repetitions. For example, the UE 120 may receive information identifying transmit beams 1, 4, 11, and 15, and may determine a mapping of transmit beams 1, 4, 11, and 15 to four repetitions. In some aspects, the UE 120 may determine the mapping based at least in part on a slot in which the grant is received. In some aspects, the UE 120 may determine the mapping based at least in part on information indicating the mapping. For example, the mapping may be dynamically indicated. In some aspects, the UE 120 may store information identifying multiple, different mappings, and may receive an indication of which mapping, of the multiple, different mappings, is to be used.

In some aspects, when the UE 120 is to identify transmit beams for an uplink repetition transmission by the UE 120, the UE 120 may identify the transmit beams based at least in part on a beam correspondence between the transmit beams and receive beams of the UE 120. For example, the UE 120 may receive information identifying transmit beams of the BS 110 that are used to communicate with the UE 120. The UE 120 may determine a mapping of the transmit beams of the BS 110 to receive beams of the UE 120. The receive beams of the UE 120 may correspond to transmit beams of the UE 120. For example, the UE 120 may use the receive beams as the transmit beams to transmit the uplink repetition transmission. In this way, the BS 110 may indicate transmit beam capabilities of the BS 110, and the UE 120 may determine transmit beams for the uplink repetition communication based at least in part on the transmit beam capabilities of the BS 110.

As indicated above, FIG. 11 is provided as an example. Other examples are possible and may differ from what was described with respect to FIG. 11.

Figure 12A:
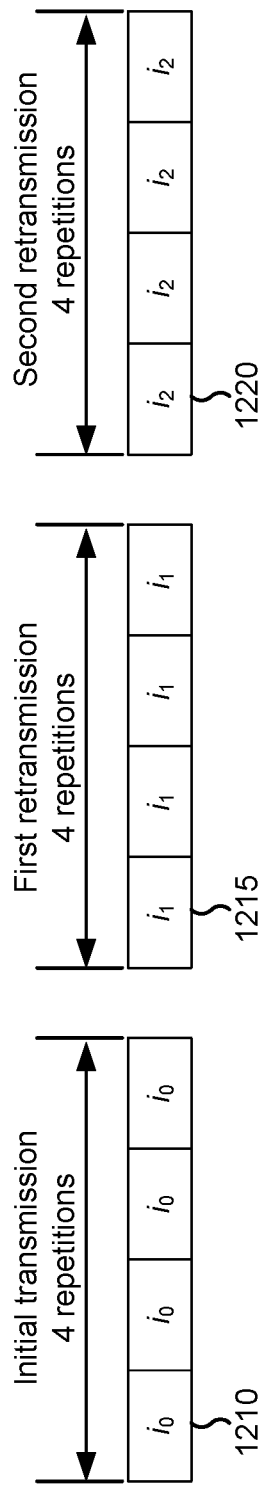
FIGS. 12A-12C are diagrams illustrating examples of determination of a plurality of beams for a repetition transmission, in accordance with various aspects of the present disclosure.
Figure 12B:
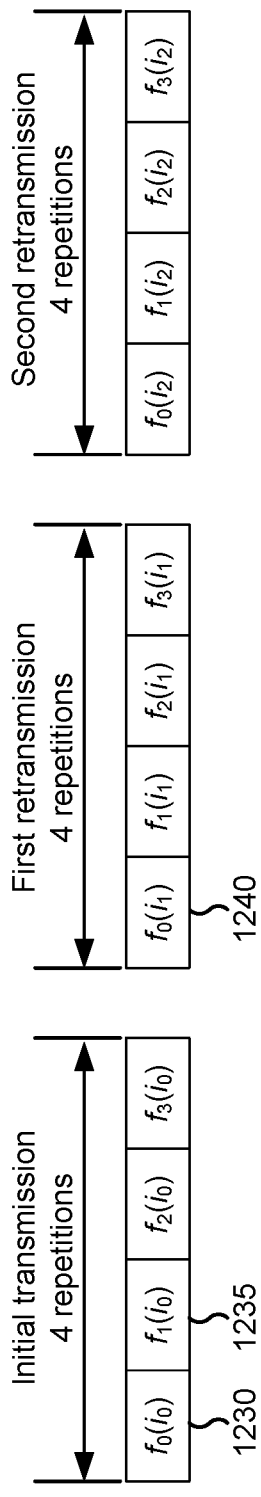
Figure 12C:
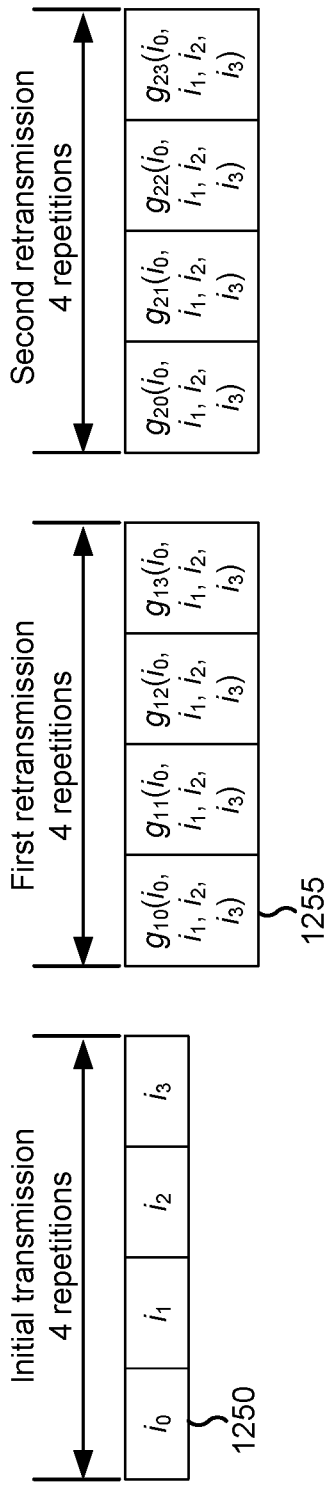

FIGS. 12A-12C are diagrams illustrating examples 1200 of determination of a plurality of beams for a repetition transmission, in accordance with various aspects of the present disclosure. FIGS. 12A-12C describe techniques for identifying transmit beams for repetition communications that are associated with an initial transmission and one or more retransmissions, such as HARQ retransmissions. The techniques described in connection with FIGS. 12A-12C are applicable in the uplink, the downlink, and both the uplink and the downlink.

FIG. 12A relates to a case wherein a cycling pattern indicates that a different beam is used for each retransmission. As shown in FIG. 12A, and by reference number 1205, assume a beam cycling pattern of $i_0$, $i_1$, $i_2$ is configured for an initial transmission, a first retransmission, and a second retransmission. Thus, and as shown by reference number 1210, a beam $i_0$ may be used for each repetition of the initial transmission. Further, as shown by reference number 1215, a beam $i_1$ may be used for each repetition of the first retransmission. Further, as shown by reference number 1220, a beam is may be used for each repetition of the second retransmission. The technique described in connection with FIG. 12A may simplify implementation and reduce time associated with retuning of transmit beams and/or receive beams.

FIG. 12B relates to a case wherein a cycling pattern indicates that a different beam is used for each retransmission, and wherein a beam mapping is derived based at least in part on the cycling pattern. As shown by reference number 1225, assume a beam cycling pattern of $i_0$, $i_1$, $i_2$ is configured for an initial transmission, a first retransmission, and a second retransmission, as described in more detail above. As further shown, a function $f_k$ may be used to determine a beam mapping, and the beam mapping may be used to determine output beams for the initial transmission and the retransmissions based at least in part on the beam cycling pattern. For example, $f_k$ may map a beam for a kth repetition to the $i_n$th beam associated with a particular transmission and/or retransmission. In some aspects, $f_k$ may be defined to be different for an initial transmission than for a retransmission, as described in more detail below.

As shown by reference number 1230, a first repetition of the initial transmission may use a beam $f_0(i_0)$. As shown by reference number 1235, a second repetition of the initial transmission may use a beam $f_1(i_0)$. Thus, spatial diversity is achieved within a single transmission. Furthermore, and as shown by reference number 1240, a first repetition of the first retransmission may use a beam $f_0(i_1)$. In this way, spatial diversity is also achieved between a same repetition of two different transmissions or retransmissions.

FIG. 12C relates to a case wherein a cycling pattern indicates that a different beam is used for each repetition of a transmission, and wherein a beam mapping is derived based at least in part on the cycling pattern. As shown in FIG. 12C, and by reference number 1245, the cycling pattern may be indicated for each transmission. For example, the beam cycling pattern may indicate that the UE 120 is to use beams $i_0$, $i_1$, $i_2$, $i_3$ for the four repetitions of the initial transmission, as shown by reference number 1250.

As further shown, the UE 120 may use a function $g_{jk}$ to determine the beam mapping for the first retransmission and the second retransmission. The function $g_{jk}$ may map a beam pattern to the ith beam used for the kth repetition in the jth HARQ retransmission, as described in more detail below. An output beam for each repetition of each HARQ transmission or retransmission may be determined according to the mapping of the beam pattern to the ith beam, the kth repetition, and the jth HARQ retransmission.

For example, and as shown by reference number 1255, a beam for a first repetition of a first retransmission of the repetition communication may be determined based at least in part on $g_{10}(i_0, i_1, i_2, i_3)$, whereas a beam for a second repetition of the first retransmission of the repetition communication may be determined based at least in part on $g_{10}(i_0, i_1, i_2, i_3)$. In this way, spatial diversity is achieved between the first repetition and the second repetition. Furthermore, and as shown, a beam for a first repetition of a second retransmission of the repetition communication may be determined based at least in part on $g_{11}(i_0, i_1, i_2, i_3)$. In this way, spatial diversity is achieved between the first repetitions of different retransmissions. Furthermore, by determining beam mappings based at least in part on the beam pattern for the entire transmission, rather than a single beam prescribed by the beam pattern for a particular repetition, versatility of the beam determination is improved.

In some aspects, different beam patterns may be configured or prescribed for different HARQ transmissions or retransmissions. For example, a first beam pattern may be configured or identified for an initial transmission, and a second beam pattern may be configured or identified for a first retransmission. In such a case, the second beam pattern may be different than the first beam pattern. For example, the second beam pattern may have an offset in the spatial domain from the first beam pattern, which improves spatial diversity of the initial transmission and the first retransmission.

In some aspects, the transmit beams may be determined based at least in part on a beam cycling technique and a frequency hopping technique. In such a case, the frequency hopping interval of the frequency hopping technique may be configured to be longer than or equal to the beam cycling technique. For example, the beam cycling may be performed for a block size or bundle size of X, and the frequency hopping may be performed for a block size or bundle size of Y, wherein Y is greater than or equal to X. This may allow coherent combining of X slots of the transmission. For example, for a 24-slot repetition, 4 beams can be configured. For every 6 slots, a new beam may be used. Thus, coherent combining can be performed for every 6 slots, assuming that the frequency hopping interval Y is greater than 6. In some aspects, when frequency hopping is used, beam cycling may be disabled. Additionally, or alternatively, when beam cycling is used, frequency hopping may be disabled.

As indicated above, FIGS. 12A-12C are provided as examples. Other examples are possible and may differ from what was described with respect to FIGS. 12A-12C.

FIG. 13 is a diagram illustrating an example process 1300 performed, for example, by a user equipment, in accordance with various aspects of the present disclosure. Example process 1300 is an example where a user equipment (e.g., UE 120) performs early transmission of a PDSCH repetition transmission.

As shown in FIG. 13, in some aspects, process 1300 may include receiving a grant for a transmission having a first number of repetitions, wherein a user equipment is configured to selectively provide an acknowledgment for the transmission after a second number of repetitions that is less than the first number of repetitions (block 1310). For example, the user equipment (e.g., using antenna 252, DEMOD 254, MIMO detector 256, receive processor 258, controller/processor 280, and/or the like) may receive a grant for a transmission having a first number of repetitions. The user equipment may be configured to selectively provide an acknowledgment after a second number of repetitions that is less than the first number of repetitions. For example, the user equipment may provide the acknowledgment when the user equipment successfully decodes the transmission after the second number of repetitions so that a base station ceases transmitting repetitions of the transmission. When the user equipment does not provide the acknowledgment after the second number of repetitions, or when the user equipment provides a NACK, the base station may know that decoding of the transmission was unsuccessful.

As shown in FIG. 13, in some aspects, process 1300 may include attempting to decode the transmission after the second number of repetitions (block 1320). For example, the user equipment (e.g., using controller/processor 280 and/or the like) may attempt to decode the transmission after the second number of repetitions.

As shown in FIG. 13, in some aspects, process 1300 may include selectively providing the acknowledgment after the second number of repetitions based at least in part on a result of attempting to decode the transmission (block 1330). For example, the user equipment (e.g., using controller/processor 280, transmit processor 264, TX MIMO processor 266, MOD 254, antenna 252, and/or the like) may provide the acknowledgment when the attempt to decode the transmission after the second number of repetitions is successful. Additionally, or alternatively, the user equipment may not provide the acknowledgment when the attempt to decode the transmission after the second number of repetitions is unsuccessful. In some aspects, the user may provide the acknowledgment to cause one or more remaining repetitions of the transmission not to be performed.

Process 1300 may include additional aspects, such as any single aspect or any combination of aspects described below and/or in connection with one or more other processes described elsewhere herein.

In some aspects, when the acknowledgment is provided, the method further comprises receiving an indication that the one or more remaining repetitions are not to be performed, wherein the information is a dedicated bit of downlink control information. In some aspects, the indication is a dedicated bit of downlink control information. In some aspects, the grant is a first grant for a first transmission, and the indication is a second grant for a second transmission. In some aspects, another acknowledgment is selectively provided for the second transmission after the second number of repetitions based at least in part on attempting to decode the second transmission.

In some aspects, the acknowledgment is provided based at least in part on the attempt to decode being successful. In some aspects, when the acknowledgment is not provided after the second number of repetitions, the user equipment may receive the one or more remaining repetitions, attempt to decode the one or more remaining repetitions, and/or selectively provide the acknowledgment based at least in part on a result of attempting to decode the one or more remaining repetitions, wherein, when the one or more remaining repetitions are not successfully decoded, the acknowledgment is not provided. In some aspects, the transmission is a downlink shared channel transmission or a downlink control channel transmission.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
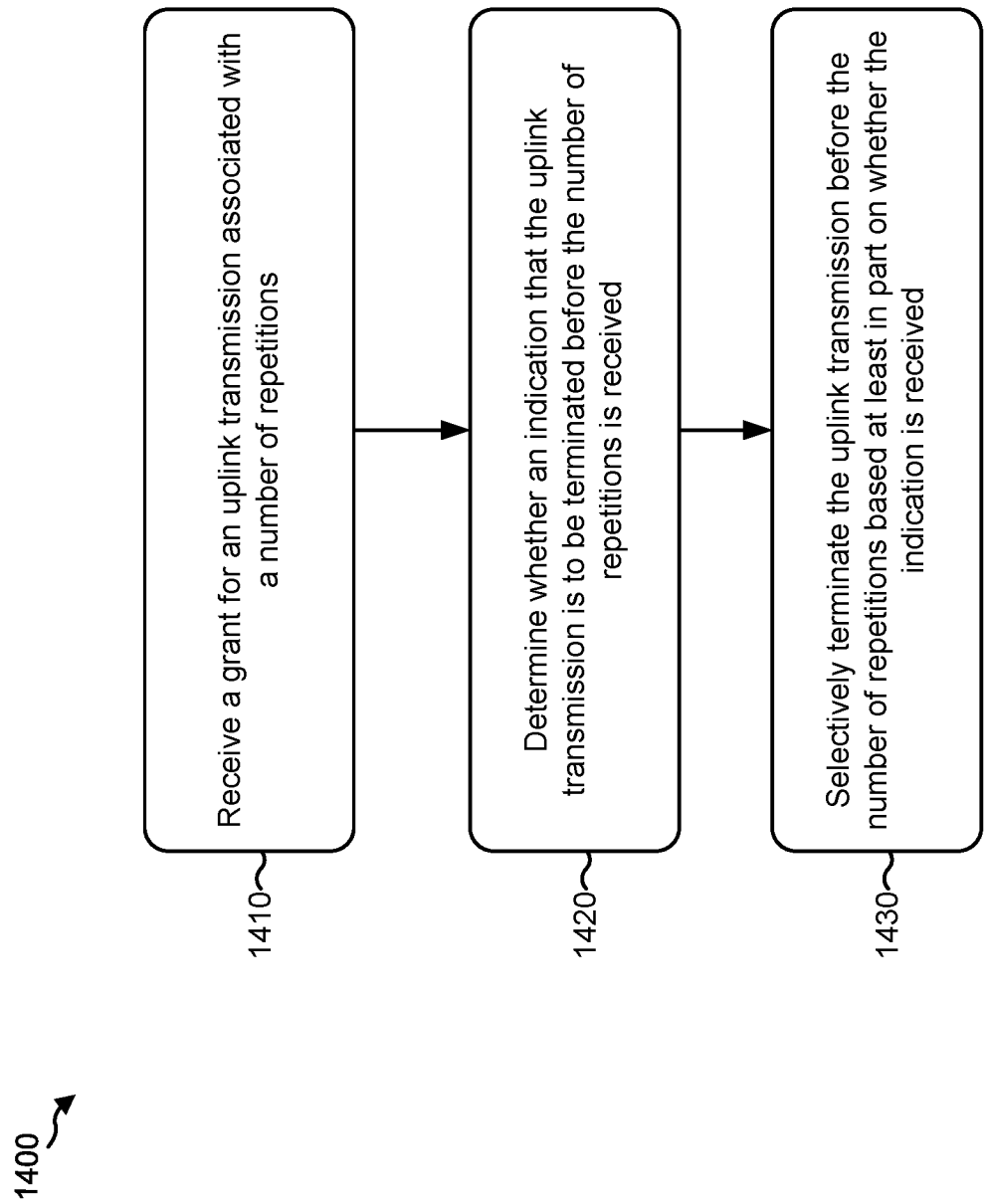
FIG. 14 is a diagram illustrating an example process performed, for example, by a user equipment, in accordance with various aspects of the present disclosure.

FIG. 14 is a diagram illustrating an example process 1400 performed, for example, by a UE, in accordance with various aspects of the present disclosure. Example process 1400 is an example where a user equipment (e.g., UE 120) performs early termination of a PUSCH repetition transmission.

As shown in FIG. 14, in some aspects, process 1400 may include receiving a grant for an uplink transmission associated with a number of repetitions (block 1410). For example, the user equipment (e.g., using antenna 252, DEMOD 254, MIMO detector 256, receive processor 258, controller/processor 280, and/or the like) may receive a grant for an uplink transmission to be transmitted by the user equipment. The uplink transmission may be associated with a number of repetitions. In some aspects, the uplink transmission may be associated with a number of retransmissions. For example, the uplink transmission may include or be associated with two retransmissions of four repetitions each, three retransmissions of four repetitions each, and/or a different number of retransmissions and/or repetitions.

As shown in FIG. 14, in some aspects, process 1400 may include determining whether an indication that the uplink transmission is to be terminated before the number of repetitions is received (block 1420). For example, the user equipment (e.g., using controller/processor 280 and/or the like) may determine an indication is received (e.g., in particular resources). The indication may indicate that the uplink transmission is to be terminated before the number of repetitions is performed or transmitted. For example, a base station may provide the indication when the base station has successfully decoded the uplink transmission before the prescribed number of repetitions (e.g., and/or retransmissions).

As shown in FIG. 14, in some aspects, process 1400 may include selectively terminating the uplink transmission before the number of repetitions based at least in part on whether the indication is received (block 1430). For example, the user equipment (e.g., using controller/processor 280, transmit processor 264, TX MIMO processor 266, MOD 254, antenna 252, and/or the like) may selectively terminate the uplink transmission before the number of repetitions based at least in part on whether the indication is received. In some aspects, the user equipment may terminate the uplink transmission when the indication is received. In some aspects, the user equipment may not terminate the uplink transmission (e.g., may continue to perform or transmit the repetitions) when the indication is not received.

Process 1400 may include additional aspects, such as any single aspect or any combination of aspects described below and/or in connection with one or more other processes described elsewhere herein.

In some aspects, the determination of whether the indication is received is performed periodically. In some aspects, the uplink transmission is completed when the indication is not received. In some aspects, the indication is transmitted after a subset of repetitions of the number of repetitions. In some aspects, the determination of whether the indication is received is performed by checking a particular resource. In some aspects, the particular resource is indicated in the grant. In some aspects, the particular resource is configured or selected from multiple sets of resources in which the indication can be provided. In some aspects, the indication is a dynamic indication. In some aspects, the grant is a first grant and the indication is a second grant. In some aspects, a subset of the number of repetitions is transmitted after a configured delay after the grant is received.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
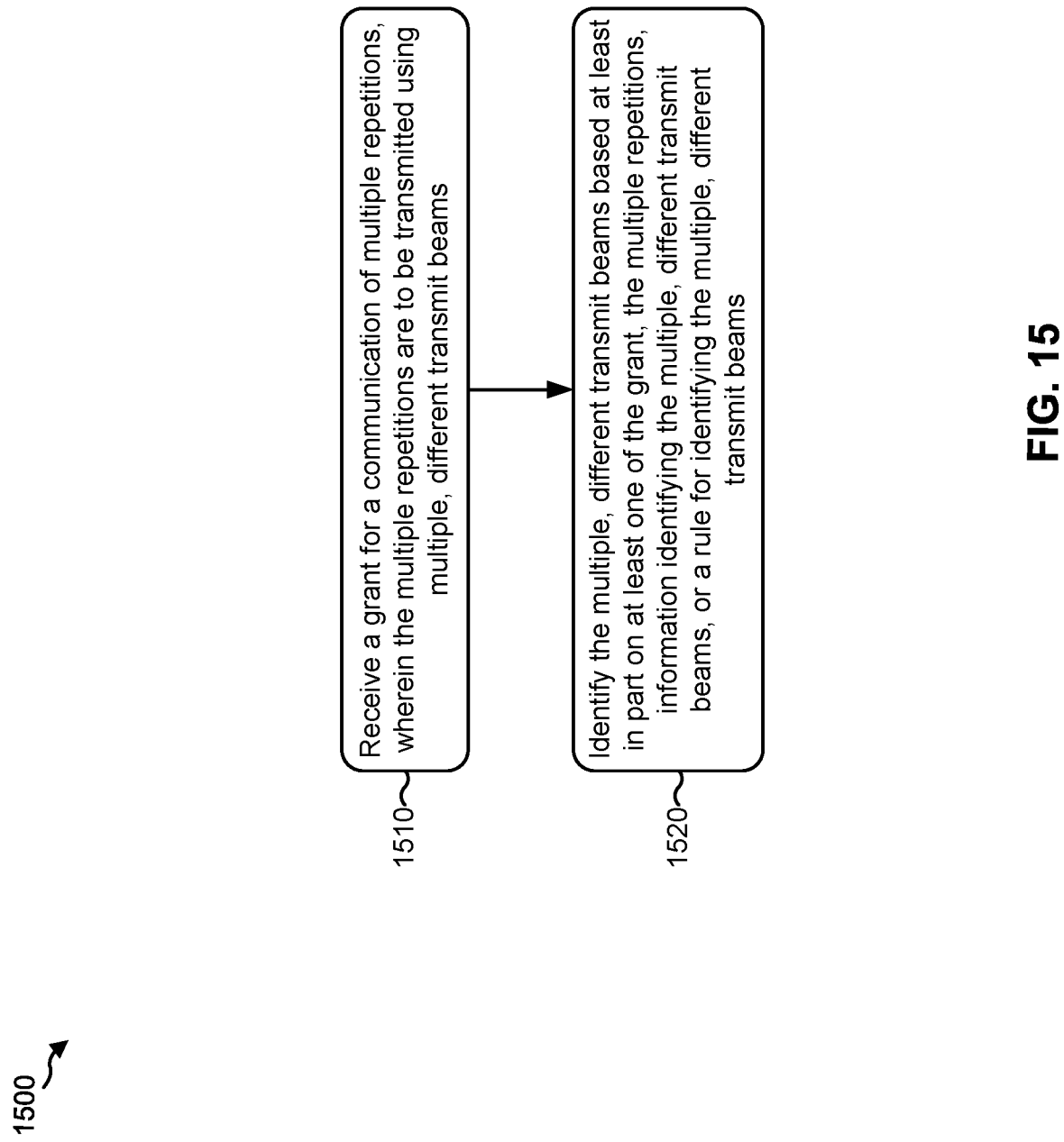
FIG. 15 is a diagram illustrating an example process performed, for example, by a user equipment, in accordance with various aspects of the present disclosure.

FIG. 15 is a diagram illustrating an example process 1500 performed, for example, by a UE, in accordance with various aspects of the present disclosure. Example process 1500 is an example where a user equipment (e.g., UE 120) performs determination of a plurality of beams for a repetition transmission.

As shown in FIG. 15, in some aspects, process 1500 may include receiving a grant for a communication of multiple repetitions, wherein the multiple repetitions are to be transmitted using multiple, different transmit beams (block 1510). For example, the user equipment (e.g., using antenna 252, DEMOD 254, MIMO detector 256, receive processor 258, controller/processor 280, and/or the like) may receive a grant for a communication of multiple repetitions. The multiple repetitions are to be transmitted using multiple, different transmit beams. For example, each repetition may be transmitted using a different transmit beam. Additionally, or alternatively, two or more repetitions may be transmitted using different transmit beams. Additionally, or alternatively, a repetition and a retransmission of the repetition may be transmitted using different beams.

As shown in FIG. 15, in some aspects, process 1500 may include identifying the multiple, different transmit beams based at least in part on at least one of the grant, the multiple repetitions, information identifying the multiple, different transmit beams, or a rule for identifying the multiple, different transmit beams (block 1520). For example, the user equipment (e.g., using controller/processor 280 and/or the like) may identify the multiple, different transmit beams. In some aspects, the user equipment may identify the multiple, different transmit beams based at least in part on at least one of the grant, the multiple repetitions, information identifying the multiple, different transmit beams (e.g., received from a base station and/or other information), or a rule for identifying the multiple, different transmit beams.

Process 1500 may include additional aspects, such as any single aspect or any combination of aspects described below and/or in connection with one or more other processes described elsewhere herein.

In some aspects, the multiple, different transmit beams are to be transmitted by the user equipment. In some aspects, the multiple, different transmit beams are to be received by the user equipment. In some aspects, the grant identifies a transmit beam for a first repetition of the communication, and wherein at least one of the multiple, different transmit beams is identified based at least in part on the transmit beam for the first repetition and based at least in part on the rule.

In some aspects, the rule identifies a cycling pattern for the multiple, different transmit beams with regard to the multiple repetitions based at least in part on at least one of a slot in which the grant was received, or a slot in which one of the multiple repetitions is to be communicated. In some aspects, the rule identifies a cycling pattern for the multiple, different transmit beams with regard to the multiple repetitions based at least in part on a slot in which one of the multiple repetitions is to be communicated. In some aspects, the information identifying the multiple, different transmit beams is received in at least one of the grant, downlink control information, a media access control (MAC) control element (CE), or a radio resource control (RRC) signaling.

In some aspects, the user equipment is configured to store information identifying multiple, different cycling patterns for transmit beams, and the information identifying the multiple, different transmit beams identifies a selected cycling pattern of the multiple, different cycling patterns. In some aspects, the information identifying the multiple, different transmit beams identifies a respective transmit beam for each repetition of the multiple repetitions. In some aspects, the information identifying the multiple, different transmit beams is indicated in the grant. In some aspects, the information identifying the multiple, different transmit beams identifies a set of transmit beams, and the multiple, different transmit beams are identified from the set of transmit beams based at least in part on a slot in which the grant is received.

In some aspects, the information identifying the multiple, different transmit beams identifies a set of transmit beams, and the multiple, different transmit beams are identified from the set of transmit beams based at least in part on information indicating a correspondence between the multiple, different transmit beams and the multiple repetitions. In some aspects, the information identifying the multiple, different transmit beams identifies a plurality of transmit beams transmitted by a base station (e.g., BS 110), and the user equipment is configured to identify a plurality of beams of the multiple, different transmit beams based at least in part on the plurality of transmit beams transmitted by the base station and a beam correspondence between the plurality of beams and a plurality of receive beams, of the user equipment, corresponding to the multiple, different transmit beams.

In some aspects, the communication is a first transmission of a plurality of transmissions, wherein each transmission of the plurality of transmissions includes a respective plurality of repetitions, and wherein one or more transmit beams of the multiple, different transmit beams are identified for each plurality of repetitions of the respective plurality of repetitions. In some aspects, a first transmit beam, of the one or more transmit beams, is used for the multiple repetitions of the first transmission and a second transmit beam, of the one or more transmit beams, is used for a plurality of repetitions, of the respective pluralities of repetitions, of a second transmission of the plurality of transmissions. In some aspects, the one or more transmit beams are identified based at least in part on a cycling pattern associated with the multiple, different transmit beams and based at least in part on a particular repetition for which the one or more transmit beams are to be transmitted. In some aspects, a first transmit beam cycle is used for the multiple repetitions of the first transmission, and a second transmit beam cycle is determined, based at least in part on the first transmit beam cycle, for a plurality of repetitions, of the respective pluralities of repetitions, of a second transmission of the plurality of transmissions. In some aspects, a first transmit beam cycle is used for the multiple repetitions of the first transmission and a second transmit beam cycle is used for a plurality of repetitions, of the respective pluralities of repetitions, of a second transmission of the plurality of transmissions, and the second transmit beam cycle is associated with a different beam pattern than the first transmit beam cycle.

In some aspects, the multiple, different beams are determined based at least in part on at least one of a beam cycling technique or a frequency hopping technique. In some aspects, a frequency hopping interval is configured to be longer than or equal to a beam cycling interval of the communication. In some aspects, the multiple, different beams are determined based at least in part on a beam cycling technique, and wherein a frequency hopping configuration of the user equipment is disabled. In some aspects, the multiple, different beams are determined based at least in part on a frequency hopping technique, and wherein a beam cycling configuration of the user equipment is disabled.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   receiving a grant for a communication of multiple repetitions,
      wherein the multiple repetitions are to be transmitted using multiple, different transmit beams; and
   identifying the multiple, different transmit beams based at least in part on at least one of:
      the grant,
      the multiple repetitions,
      information identifying the multiple, different transmit beams, or
      a rule for identifying the multiple, different transmit beams,
         wherein the rule identifies a cycling pattern for the multiple, different transmit beams with regard to the multiple repetitions based at least in part on at least one of:
            a slot in which the grant was received, or
            a slot in which one of the multiple repetitions is to be communicated.

2. The method of claim 1, wherein the multiple, different transmit beams are to be received by the user equipment.

3. The method of claim 1, wherein the grant identifies a transmit beam for a first repetition of the communication, and wherein at least one of the multiple, different transmit beams is identified based at least in part on the transmit beam for the first repetition and based at least in part on the rule.

4. The method of claim 1, wherein the information identifying the multiple, different transmit beams identifies a respective transmit beam for each repetition of the multiple repetitions.

5. The method of claim 1, wherein the information identifying the multiple, different transmit beams identifies a set of transmit beams, and
wherein the multiple, different transmit beams are identified from the set of transmit beams based at least in part on a slot in which the grant is received.

6. The method of claim 1, wherein the information identifying the multiple, different transmit beams identifies a set of transmit beams, and
wherein the multiple, different transmit beams are identified from the set of transmit beams based at least in part on information indicating a correspondence between the multiple, different transmit beams and the multiple repetitions.

7. The method of claim 1, wherein the information identifying the multiple, different transmit beams identifies a plurality of transmit beams transmitted by a base station, and
wherein the user equipment is configured to identify a plurality of beams of the multiple, different transmit beams based at least in part on the plurality of transmit beams transmitted by the base station and a beam correspondence between the plurality of beams and a plurality of receive beams, of the user equipment, corresponding to the multiple, different transmit beams.

8. The method of claim 1, wherein the communication is a first transmission of a plurality of transmissions,
wherein each transmission of the plurality of transmissions includes a respective plurality of repetitions, and
wherein one or more transmit beams of the multiple, different transmit beams are identified for each plurality of repetitions of the respective plurality of repetitions.

9. The method of claim 8, wherein a first transmit beam, of the one or more transmit beams, is used for the multiple repetitions of the first transmission and a second transmit beam, of the one or more transmit beams, is used for a plurality of repetitions, of the respective pluralities of repetitions, of a second transmission of the plurality of transmissions.

10. The method of claim 8, wherein the one or more transmit beams are identified based at least in part on a cycling pattern associated with the multiple, different transmit beams and based at least in part on a particular repetition for which the one or more transmit beams are to be transmitted.

11. The method of claim 8, wherein a first transmit beam cycle is used for the multiple repetitions of the first transmission, and
wherein a second transmit beam cycle is determined, based at least in part on the first transmit beam cycle, for a plurality of repetitions, of the respective pluralities of repetitions, of a second transmission of the plurality of transmissions.

12. The method of claim 8, wherein a first transmit beam cycle is used for the multiple repetitions of the first transmission and a second transmit beam cycle is used for a plurality of repetitions, of the respective pluralities of repetitions, of a second transmission of the plurality of transmissions,
wherein the second transmit beam cycle is associated with a different beam pattern than the first transmit beam cycle.

13. The method of claim 1, wherein the multiple, different transmit beams are determined based at least in part on at least one of a beam cycling technique or a frequency hopping technique.

14. A user equipment for wireless communication, comprising:
a memory; and
one or more processors operatively coupled to the memory, the one or more processors configured to:
receive a grant for a communication of multiple repetitions,
wherein the multiple repetitions are to be transmitted using multiple, different transmit beams,
wherein the communication is a first transmission of a plurality of transmissions,
wherein each transmission of the plurality of transmissions includes a respective plurality of repetitions, and
wherein one or more transmit beams of the multiple, different transmit beams are identified for each plurality of repetitions of the respective plurality of repetitions; and
identify the multiple, different transmit beams based at least in part on at least one of:
the grant,
the multiple repetitions,
information identifying the multiple, different transmit beams, or
a rule for identifying the multiple, different transmit beams.

15. The user equipment of claim 14, wherein the multiple, different transmit beams are to be received by the user equipment.

16. The user equipment of claim 14, wherein the grant identifies a transmit beam for a first repetition of the communication, and wherein at least one of the multiple, different transmit beams is identified based at least in part on the transmit beam for the first repetition and based at least in part on the rule.

17. The user equipment of claim 14, wherein the rule identifies a cycling pattern for the multiple, different transmit beams with regard to the multiple repetitions based at least in part on at least one of:
a slot in which the grant was received, or
a slot in which one of the multiple repetitions is to be communicated.

18. The user equipment of claim 14, wherein the information identifying the multiple, different transmit beams identifies a respective transmit beam for each repetition of the multiple repetitions.

19. The user equipment of claim 14, wherein the information identifying the multiple, different transmit beams identifies a set of transmit beams, and
wherein the multiple, different transmit beams are identified from the set of transmit beams based at least in part on a slot in which the grant is received.

20. The user equipment of claim 14, wherein the information identifying the multiple, different transmit beams identifies a set of transmit beams, and
wherein the multiple, different transmit beams are identified from the set of transmit beams based at least in part on information indicating a correspondence between the multiple, different transmit beams and the multiple repetitions.

21. The user equipment of claim 14, wherein the information identifying the multiple, different transmit beams identifies a plurality of transmit beams transmitted by a base station, and
wherein the user equipment is configured to identify a plurality of beams of the multiple, different transmit beams based at least in part on the plurality of transmit beams transmitted by the base station and a beam correspondence between the plurality of beams and a plurality of receive beams, of the user equipment, corresponding to the multiple, different transmit beams.

22. The user equipment of claim 14, wherein a first transmit beam, of the one or more transmit beams, is used for the multiple repetitions of the first transmission and a second transmit beam, of the one or more transmit beams, is used for a plurality of repetitions, of the respective pluralities of repetitions, of a second transmission of the plurality of transmissions.

23. The user equipment of claim 14, wherein the one or more transmit beams are identified based at least in part on a cycling pattern associated with the multiple, different transmit beams and based at least in part on a particular repetition for which the one or more transmit beams are to be transmitted.

24. The user equipment of claim 14, wherein a first transmit beam cycle is used for the multiple repetitions of the first transmission, and
wherein a second transmit beam cycle is determined, based at least in part on the first transmit beam cycle, for a plurality of repetitions, of the respective pluralities of repetitions, of a second transmission of the plurality of transmissions.

25. The user equipment of claim 14, wherein a first transmit beam cycle is used for the multiple repetitions of the first transmission and a second transmit beam cycle is used for a plurality of repetitions, of the respective pluralities of repetitions, of a second transmission of the plurality of transmissions,
wherein the second transmit beam cycle is associated with a different beam pattern than the first transmit beam cycle.

26. The user equipment of claim 14, wherein the multiple, different transmit beams are determined based at least in part on at least one of a beam cycling technique or a frequency hopping technique.

27. A non-transitory computer-readable medium storing a set of instructions for wireless communication, the set of instructions comprising:
one or more instructions that, when executed by one or more processors of a user equipment, cause the user equipment to:
receive a grant for a communication of multiple repetitions,
wherein the multiple repetitions are to be transmitted using multiple, different transmit beams; and
identify the multiple, different transmit beams based at least in part on at least one of:
the grant,
the multiple repetitions,
information identifying the multiple, different transmit beams, or
a rule for identifying the multiple, different transmit beams, and
wherein the information identifying the multiple, different transmit beams identifies a set of transmit beams, and
wherein the multiple, different transmit beams are identified from the set of transmit beams based at least in part on a slot in which the grant is received.

28. An apparatus for wireless communication, comprising:
means for receiving a grant for a communication of multiple repetitions,
wherein the multiple repetitions are to be transmitted using multiple, different transmit beams; and
means for identifying the multiple, different transmit beams based at least in part on at least one of:
the grant,
the multiple repetitions,
information identifying the multiple, different transmit beams, or
a rule for identifying the multiple, different transmit beams, and
wherein the information identifying the multiple, different transmit beams identifies a plurality of transmit beams transmitted by a base station, and
wherein the user equipment is configured to identify a plurality of beams of the multiple, different transmit beams based at least in part on the plurality of transmit beams transmitted by the base station and a beam correspondence between the plurality of beams and a plurality of receive beams, of the user equipment, corresponding to the multiple, different transmit beams.

* * * * *